(12) United States Patent  
Carson et al.

(10) Patent No.: US 6,263,747 B1  
(45) Date of Patent: Jul. 24, 2001

(54) REMOTE INSTALLATION METHOD AND TOOL

(75) Inventors: Douglas Timothy Carson, Lincoln; Paul George Wright, Pleasant Dale; John D. Hull, Lincoln, all of NE (US)

(73) Assignee: Isco, Inc., Lincoln, NE (US)

( * ) Notice: Subject to any disclaimer, the term of this patent is extended or adjusted under 35 U.S.C. 154(b) by 961 days.

(21) Appl. No.: 08/502,560

(22) Filed: Jul. 14, 1995

(51) Int. Cl.[7] .................................................... B08B 9/00
(52) U.S. Cl. ............................................................. 73/866.5
(58) Field of Search ................................. 73/866.5, 865.8, 73/198, 622, 623; 324/220, 221; 138/108; 248/542, 682, 689, 690, 75, 511, 514, 517, 317, 327

(56) References Cited

U.S. PATENT DOCUMENTS

| | | | |
|---|---|---|---|
| 3,444,578 | * | 5/1969 | Caperton ............................ 15/104.31 |
| 3,497,899 | * | 3/1970 | Caperton ............................ 15/104.31 |
| 4,586,380 | * | 5/1986 | Patterson ................................. 73/623 |
| 5,329,662 | * | 7/1994 | Salecker ............................. 15/104.31 |
| 5,503,033 | * | 4/1996 | Van Niekerk ........................ 73/865.8 |

OTHER PUBLICATIONS

Advertisement for American Sigma Street Level Insertion Tool.
Advertisement for Montedoro–Whitney QWIK–STK sewer flow probe.

* cited by examiner

Primary Examiner—Robert Raevis
(74) Attorney, Agent, or Firm—Vincent L. Carney

(57) ABSTRACT

To insert an instrument into a flow stream of a sewer pipe from the street, the instrument is fastened to a holder, which in turn is fastened to a portion of an expansion ring opposite its two opened edges. A cord is fastened to one of the edges of the expansion ring and passes over a curved post mounted to the other edge of the expansion ring and extended upwardly in a direction parallel to the edges of the expansion ring so that it can be pulled to compress the expansion ring to a small diameter cylinder and released to expand it against the wall of a pipe. A post is mounted to the expansion ring to permit a long tool to grip the post and move the expansion ring into a sewer pipe where it is expanded and released.

17 Claims, 5 Drawing Sheets

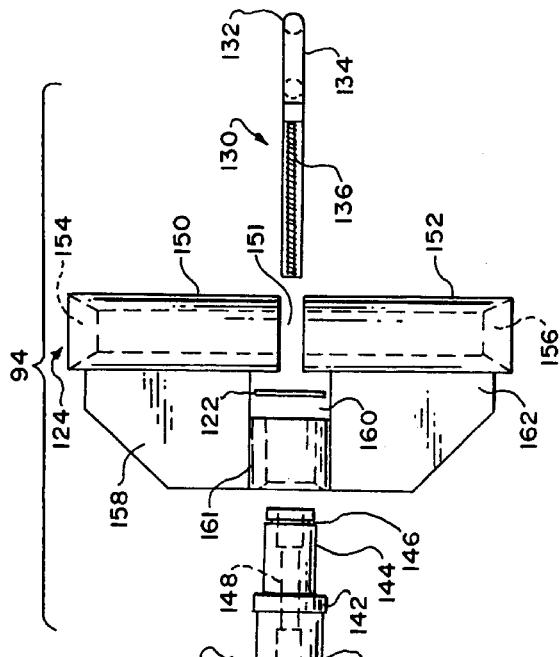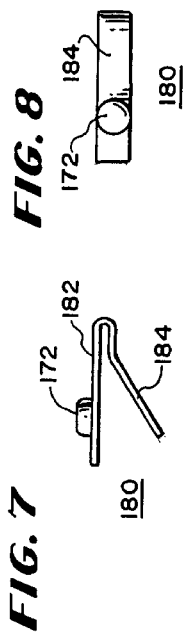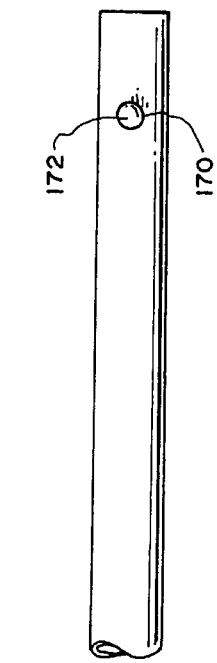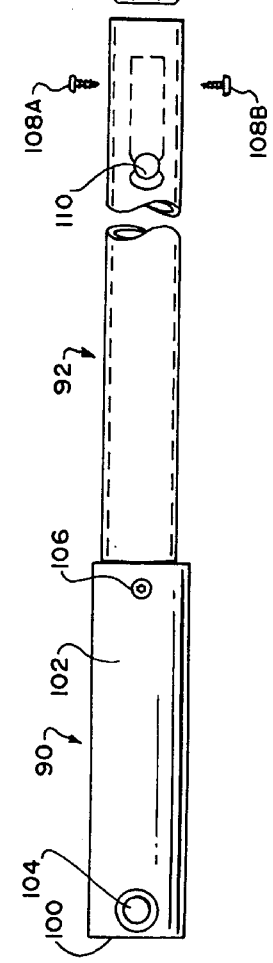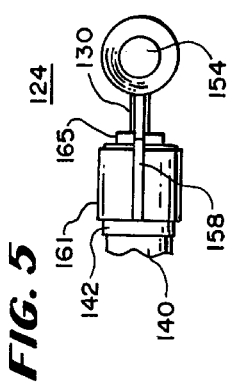

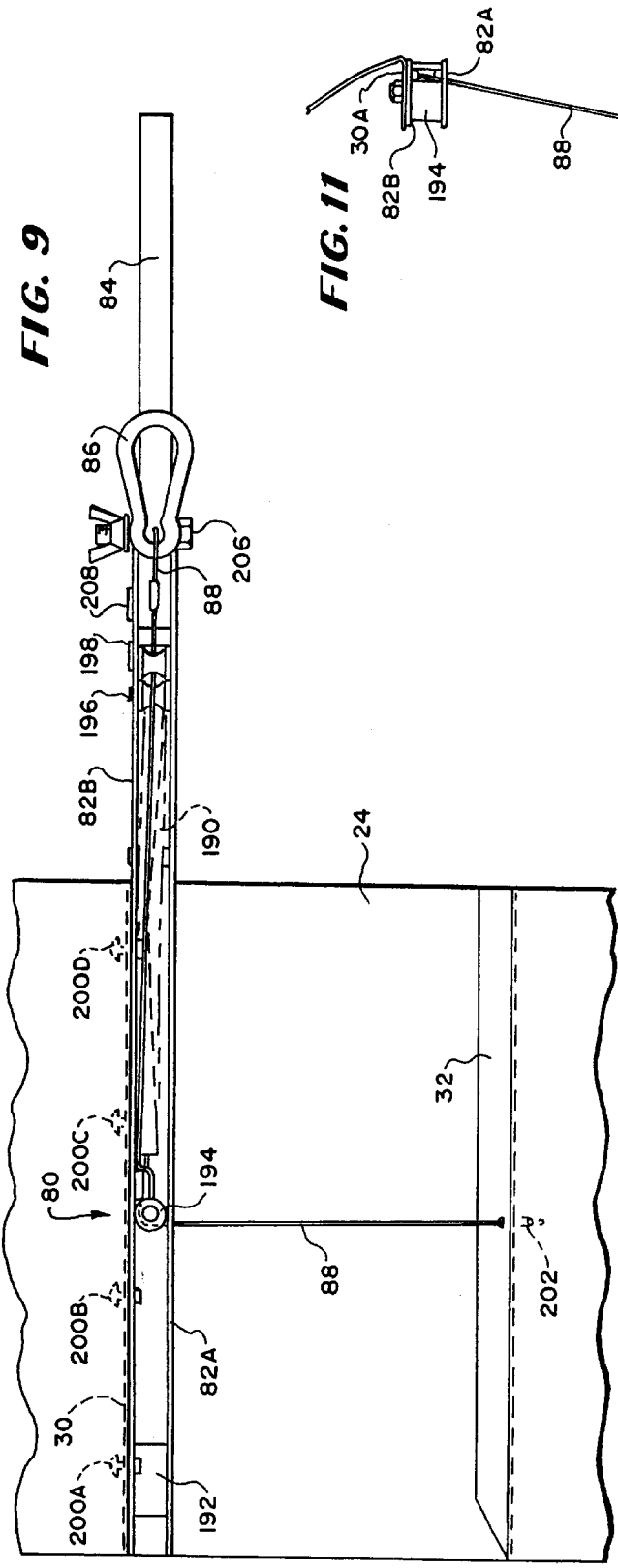
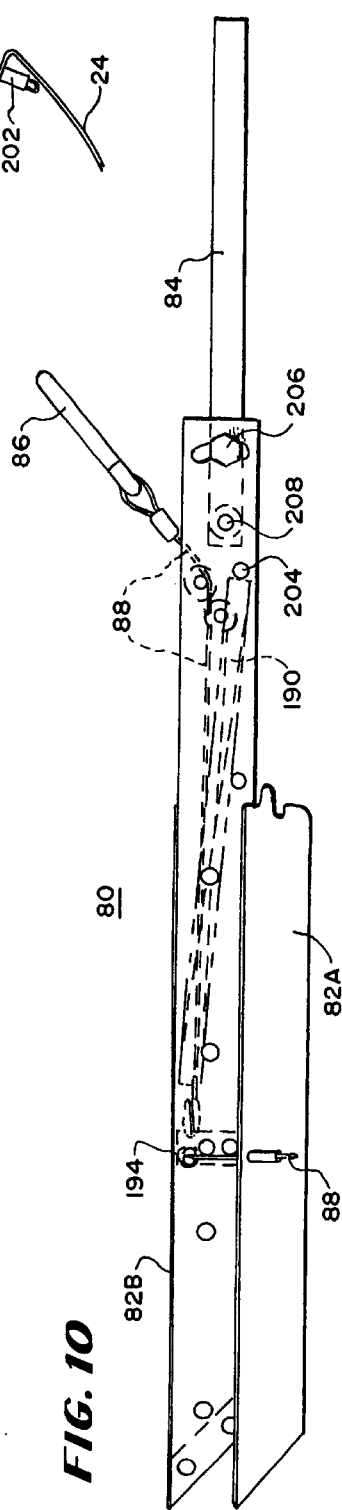
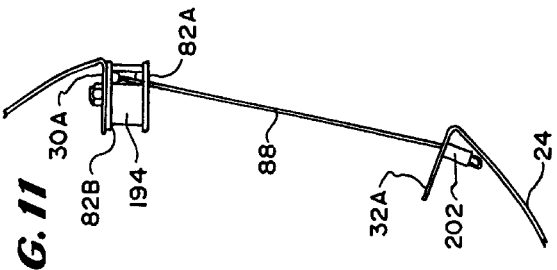

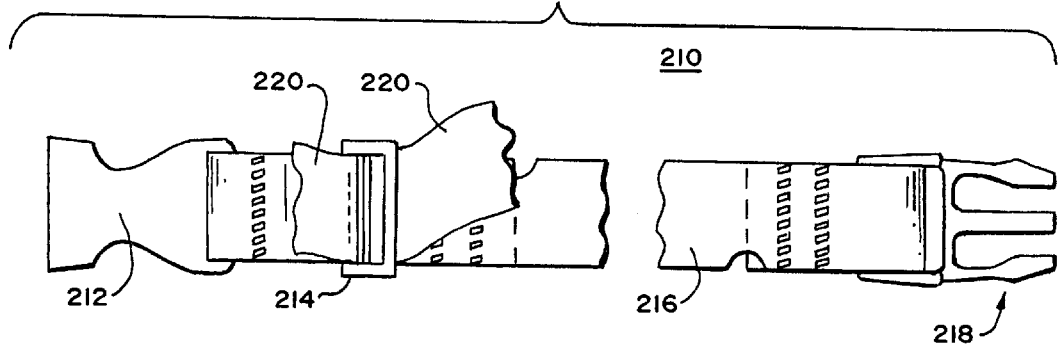
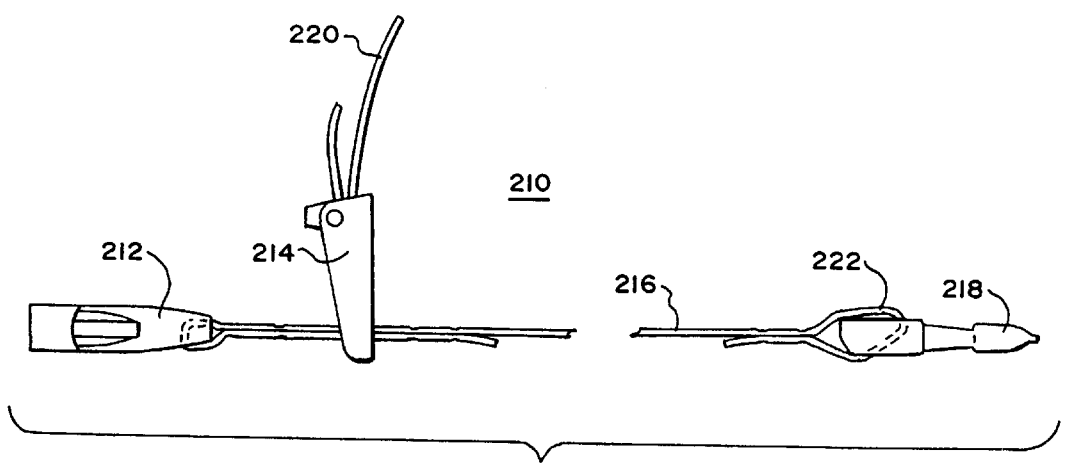

REMOTE INSTALLATION METHOD AND TOOL

BACKGROUND OF THE INVENTION

This invention relates to the installation of devices such as measuring instruments, sensors, conduits or the like from a remote location. For example, it is at times necessary to install flowmeters in sewer pipes but it is not desirable for the installer to enter the manhole and make such installation by placing his or her hands directly in the sewer pipe.

In one class of mounting apparatus, a metal expansion ring forms a cylinder slightly smaller in diameter than the sewer pipe when compressed but larger when expanded and having sufficient resilience to press against the wall of the pipe. If cylindrical, its slant height or length along the pipe is between six inches and two feet depending on the device that is to be held in place. Tabs may be cut in the bottom to hold a mounting fixture for the particular device that is to be mounted within the sewer pipe.

One method of installing devices remotely using this mounting apparatus is to: (1) fasten the device to a circular metal expansion ring sized to form a cylinder having a larger diameter than the sewer pipe when the expansion ring is expanded but able to have its ends compressed together to form a cylinder having a smaller diameter than the sewer pipe; (2) place the compressed expansion ring with the device attached within it in a sewer pipe while the expansion ring is compressed; and (3) permit the expansion ring to expand against the walls of the pipe with sufficient pressure to be held in place by frictional forces. With this procedure, the device is mounted within the sewer pipe.

In a prior art mounting method and apparatus of this class, the expansion ring contains no implement that permits it to be compressed and released from a distance. Thus, to install the expansion ring with a device attached to it, the ring must be compressed by hand and inserted into the sewer pipe from the immediate vicinity of the sewer pipe.

This type of prior art mounting method and apparatus has several disadvantages such as for example: (1) the expansion ring must be handled with the installer's hands to compress it and insert it in the sewer from the proximity of the sewer pipe, although this may require the installer to enter a manhole; (2) the installation procedure may be dangerous because of toxic materials in the sewer and manhole; (3) the procedure may be expensive since safety procedures require at least two people to be on site when someone enters a manhole; and (4) the procedure is time consuming and commonly requires special equipment for the installer to enter the manhole.

SUMMARY OF THE INVENTION

Accordingly, it is an object of the invention to provide a novel method and tool for remotely installing instruments or other apparatuses.

It is a still further object of the invention to provide a novel combination of installable mounting fixture and transfer tool for moving the mounting fixture into location with an instrument or other apparatus on it and fastening the mounting fixture and instrument or other apparatus in place.

It is a still further object of the invention to provide a novel method and apparatus for inserting expansion rings at a remote location.

It is a still further object of the invention to provide a method and apparatus for installing instruments or other devices at a remote location.

It is a still further object of the invention to provide a novel method and apparatus for installing sensing or measuring devices or other devices from a remote distance such as for installing instruments or other apparatuses from street level into sewer pipes within a manhole.

It is a still further object of the invention to provide a method and apparatus for routing and fastening cables and conduits in place within a flow stream from a remote location.

It is a still further object of the invention to provide a method and apparatus for inserting an expansion ring with a device mounted to it in a sewer pipe intersecting a manhole some distance from the surface by an installer at the surface after orienting the expansion ring to accommodate the angle of the sewer.

It is a still further object of the invention to provide a novel method and apparatus for inserting and removing expansion rings at a remote location.

In accordance with the above and further objects of the invention, a mounting fixture and a transfer tool are provided. The mounting fixture includes a first fastening means for fastening the mounting fixture at a remote location and a second fastening means for fastening an instrument, device or conduit to the mounting fixture. The transfer tool includes a means for temporarily holding the mounting fixture with an adjustable orientation and releasing the mounting fixture after it has been moved to the remote location by the transfer tool. The mounting fixture can be removed from the remote location and pulled back to the installer without the transfer tool by using the means for fastening the mounting fixture at a remote location, which in the preferred embodiment is an elongated flexible member.

In the preferred embodiment, the mounting fixture includes an expansion ring and apparatus for contracting the expansion ring and for permitting the expansion ring to expand under the control of an operator at a remote location. The expansion ring includes means for mounting an instrument, device, cable or cord to it. In the preferred embodiment, there are tabs in the expansion ring and a holder is easily mounted to the tabs to hold a device such as a sensor or conduit or the like.

The apparatus for contracting the expansion ring in the preferred embodiment includes an elongated flexible member, a fastener, and a bearing surface or pully. One end of the elongated flexible member is fastened by the fastening means to one edge of the expansion ring and the bearing surface or pully is fastened to the other edge of the expansion ring. The elongated member passes over the bearing surface or pully and its free end extends to the location of the installer so that the installer can pull the free end and force the pully or bearing surface to be pulled closer to the fastener on the opposite edge of the expansion ring to compress the expansion ring. The elongated member can be released by the installer at the remote location to permit the two edges of the expansion ring to move back in place. With this arrangement, the expansion ring may be contracted by pulling the cord, the expansion ring inserted in a pipe and the cord released so that the expansion ring tightly engages the wall of the pipe to be firmly fastened in place.

The means for fastening to the transfer tool includes a mounting post and a tubular gripping means. The post is a cylinder fastened to one edge of the expansion ring and normally extending parallel to the longitudinal axis of the expansion ring aligned with one edge of the expansion ring but being adjustable in angle about a pivot point. Moreover, because it is a cylinder that is to be gripped by a cylinder, it can be positioned at different rotational angles in the gripping means. The tubular gripping means includes two aligned bushings with an aligned eyelet between them on one side of the transfer tool. The post is slidable through the bushings and the eye of the eyelet. The eyelet includes a threaded shank mating with a tapped opening in the transfer tool so the transfer tool can be turned to create pressure between the internal walls of the hole in one direction of the post and internal walls of the bushing on the other to grip the post and hold it at one end of the transfer tool.

The transfer tool includes a plurality of sections which may be connected together to form a rigid, elongated handle so that the mounting fixture may be connected to one end of the elongated handle and the other end of the elongated handle manipulated to move the mounting fixture in place.

In operation, a device such as a flow meter sensor or the like is mounted to the mounting fixture, the mounting fixture is mounted to a transfer tool and the transfer tool is used to move the mounting fixture to the remote location, after which, the mounting fixture is remotely fastened at the location and the transfer tool removed.

To mount the sensor or other device to the mounting fixture, tabs are cut in the mounting fixture and a device holder is fastened to the tabs with the device in place. To fasten the mounting fixture to the transfer tool, the transfer tool includes a plurality of elongated handle sections, with one of the elongated handle sections having on one end a gripping means. The plurality of sections are fastened one to the other to form a rigid elongated handle with the gripping means on one end. The mounting fixture includes an elongated post which may be removably engaged with the one end of the transfer tool and gripped.

To move the mounting fixture into a location and fasten it there with the device mounted to it, an elongated flexible member is actuated to compress the mounting fixture and it is moved into location by the transfer tool in its compressed condition. The compressed condition is released from the elongated flexible member to cause the mounting fixture to expand against the walls of the location and be held in place. Then the gripping means is released from the transfer tool and removed, leaving the mounting fixture in place.

To remove the mounting fixture, the flexible elongated member is pulled, thus condensing the mounting fixture in the same manner as was done before inserting the mounting fixture into the sewer pipe. With the mounting fixture condensed to a smaller diameter, it is pulled from the sewer pipe in a series of jerking motions by pulling several times on the elongated member or cable.

If the mounting fixture is jammed in place and cannot be pulled free from the cable, the transfer tool is extended into a location adjacent to the post and the gripping means moved over the post. The gripping means is then closed. The elongated member is then used to compress the mounting fixture so that it is released from the location. It may then be pulled free and removed.

In the preferred embodiment, the mounting fixture is an expansion ring adapted to fit within sewer pipes. Tabs in its bottom are used to mount a device such as a pressure sensor, a pressure transducer, a conduit or the like.

On one edge of the expansion ring, attached to the lip, are two parallel plates positioned so that one parallel plate fastens to one lip of the expansion ring and may fit against the other edge of the expansion ring. A flexible member is attached to the other edge of the expansion ring and passes between the flat plates upwardly where it ends in a ring. A post extends from the flat plates in a direction parallel to the central axis of the expansion ring and is sized so it fits within the gripping means of the transfer tool. The transfer tool includes a flexible cord that may be fastened to the ring to pull or release the two edges of the expansion ring from a remote distance by holding onto the cord. This flexible cord may be left in place entending between the mounting fixture and the street surface.

To grip the post, the transfer tool includes an elongated rigid handle and a bottom section having an opening perpendicular to the longitudinal axis of the elongated rigid handle of the transfer tool. There are several sections which snap together to form the elongated handle of the transfer tool, the number of sections being selected in accordance with the distance between the installer and the remote location at which the mounting fixture is to be positioned. The opening in the bottom section passes through two adjacent collars with a space between them in line with the longitudinal axis of the transfer tool. These collars form part of the gripping tool of the transfer tool for moving the mounting fixture.

To provide a gripping means or fastening means to the transfer tool, there is a tapped hole aligned with the longitudinal axis of the transfer tool above the opening between the two collars and an externally threaded shank of an eyelet engages the threads of the tapped hole. The eye of the eyelet is aligned with the holes in the two collars so turning of the handle of the transfer tool raises and lowers the eyelet. When the eyelet is aligned with the opening in the center of the two bushings, the post of the mounting fixture fits through the opening in the two collars and through the eyelet between. When the elongated handle is rotated about the threaded member, with the collars being held by the posts of the bottom section of the transfer tool, the eyelet is pulled upwardly to engage the post tightly and when the handle is rotated in the opposite direction, the eyelet is moved downwardly to release the post so that it may slide in and out of the collars.

The angle of the post with respect to the expansion ring can be adjusted to provide a similar adjustment of the angle of the expansion ring with respect to the transfer tool for easier insertion in angled or offset manholes or pipes. The orientation may be changed both with respect to the rotational angle and the linear angle of the expansion ring with respect to the longitudinal axis of the transfer tool.

In operation, a device such as a sensor or conduit is mounted to the retaining ring. The opening perpendicular to the longitudinal axis of the transfer tool is then slid over the post of the mounting fixture and the elongated handle of the transfer tool is turned in a clockwise direction, thus causing the eyelet to move upwardly and engage the bottom of the post to hold it firmly in place perpendicular to the longitudinal axis of the handle. The other sections of the elongated handle are then fastened to each other to equal a distance from the top of a street downwardly through a manhole to a pipe into which the meter is to be inserted.

While standing next to the manhole, the operator moves the mounting fixture, the instrument on the mounting fixture, one end of any control or information conduits that are to extend to the surface and one end of the cable for releasing the mounting fixture downwardly through a manhole opening at the end of the transfer tool.

The mounting fixture is moved into place aligned with the sewer pipe and the expansion ring is pushed into the sewer pipe. Before pushing it into the sewer pipe, the cord is pulled to compress the expansion ring and when it is in its proper location in the sewer pipe, the cord is released to cause the expansion ring to expand against the walls of the pipe and hold the meter at the bottom of the expansion ring in place. The transfer tool is then rotated counterclockwise so that the eyelet moves downwardly to release the post. The transfer tool is then pulled longitudinally to remove it from the post and lifted upwardly again.

From the above description, it can be understood that this remote installation tool and method has several advantages, such as for example: (1) it may securely move devices such as instruments or conduits or the like to a remote location including the interior of a sewer and fasten them in place without the operator being in the proximate region of the remote location; (2) it is simple to operate and economical, being capable of operation by a single person; (3) it avoids the danger and cost of having a worker move downwardly such as for example into a manhole in order to properly install instruments while another worker remains on the surface; (4) it permits adjustment of the angle at which devices are held for mounting so as to adjust to different angled sewer pipes or offset sewer pipes; and (5) it permits easy removal of the device.

SUMMARY OF THE DRAWINGS

The above noted and other features of the invention will be better understood from the following detailed description when considered with reference to the accompanying drawings, in which:

FIG. 4 is a fragmentary exploded elevational view of a portion of a transfer tool in accordance with an embodiment of the invention;

FIG. 5 is a end view of a portion of the embodiment of FIG. 4;

FIG. 6 is an elevational view of another section of the transfer tool in accordance with an embodiment of the invention;

FIG. 7 is an elevational view of a spring used in the embodiments of FIGS. 4–6;

FIG. 8 is an elevational view of the spring of FIG. 7;

FIG. 9 is a fragmentary, broken-away view of a portion of the mounting fixture of FIG. 2;

FIG. 10 is a simplified, fragmentary perspective view of a portion of the embodiment of FIG. 9;

FIG. 11 is an illustrative sectional view of another portion of the embodiment of FIG. 9;

FIG. 12 is a fragmentary broken away plan view of a a belt use in the embodiment of FIG. 1; and FIG. 13 an elevational view of the belt of FIG. 12.

DETAILED DESCRIPTION

Figure 1:
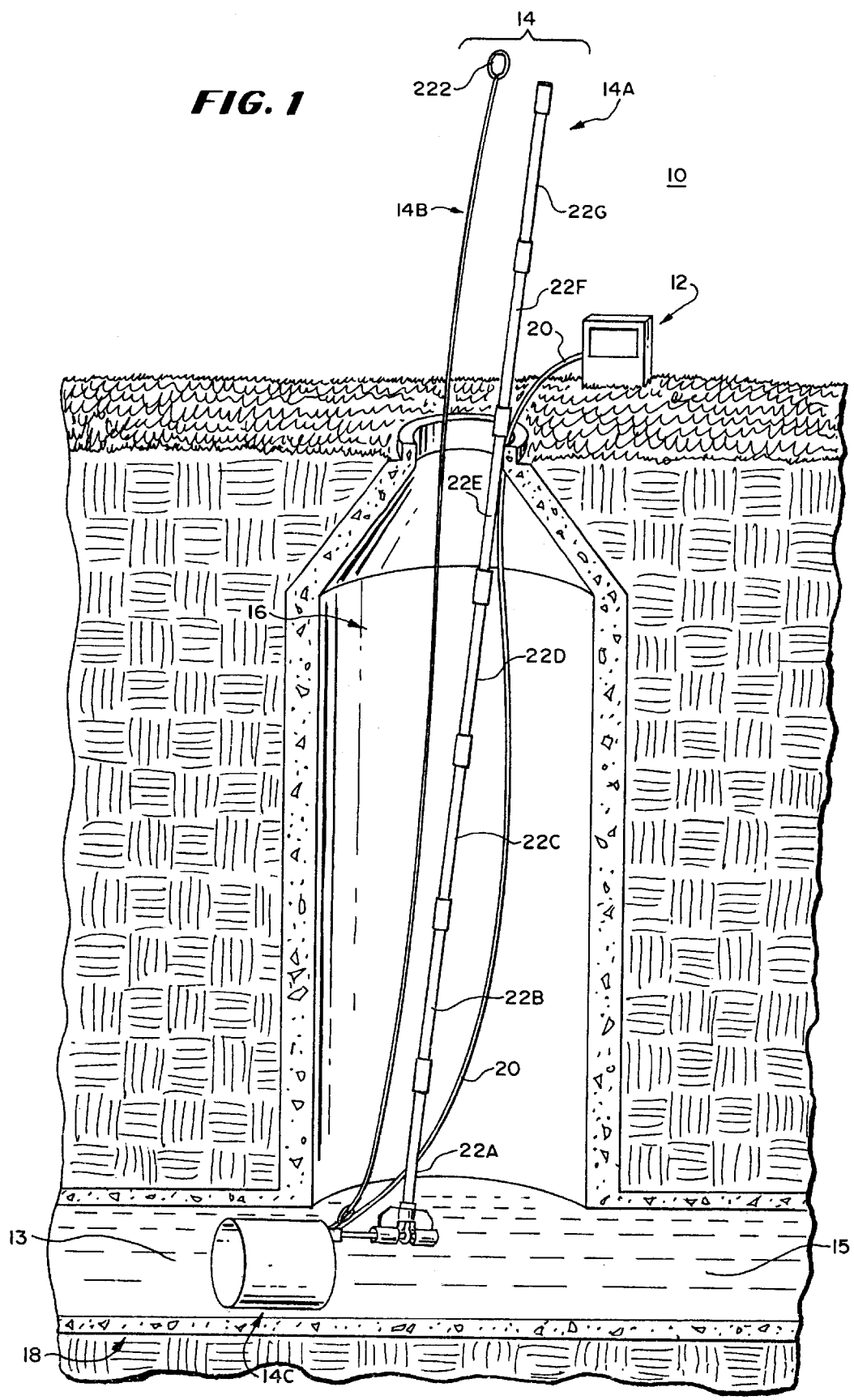
FIG. 1 is a simplified, partly schematic, cutaway away view of an embodiment of installation tool shown in a position for installing a device within a sewer from a street level surface in accordance with an embodiment of the invention.

In FIG. 1, there is shown a simplified illustrative elevational view of a remote installation 10 in use at a site, which site includes an above ground measuring instrument 12 for measuring flow rate, an air conduit 20 for conducting air pressure, a manhole 16 and a pipe 18 intersecting the manhole. Liquid flows from the upstreem location 13 in the pipe 18 to the downstream location 15.

At this site, a remote installation tool 14 includes a handle 14A, a cable or belt 14B and a mounting fixture 14C. With this arrangement, the mounting fixture 14C is lowered by the handle 14A while the cable 14B is pulled tautly to compress the mounting fixture 14C to a size smaller than the intersecting pipe 18 within the manhole 16. When it is at the proper height, the mounting fixture 14C is moved into the pipe and the cable 14B released, causing the mounting fixture 14C to expand and become fixed within the intersecting pipe 18.

To provide sufficient length to the handle 14A to move it into location, the handle 14A includes a plurality of sections, sections 22A–22G being shown in FIG. 1 to equal seven such interfitting sections. Each section snaps into the previous one in a manner to be described hereinafter and the bottom section 22A is adapted to be attached to the mounting fixture 14C and be removed by rotating the handle 14A of the transfer tool.

The handle 14A is attached to the mounting fixture 14C by any suitable fastening means. In the preferred embodiment, it is fastened by actuating a clamp, the clamp being actuated by rotating the handle 14A in one direction and released by rotating it in the opposite direction. The cable 14B is connected at one end to the mounting fixture 14C and extends to the surface with the handle 14A. Together the handle 14A and cable 14B form a transfer tool for transferring the mounting fixture 14C together with a device such as a measuring instrument to a remote location.

In the preferred embodiment, the remote installation tool 14 of this invention includes a plurality of mounting fixtures 14C which differ from each other in construction only in their size, being adapted to approximately six inches, eight inches, ten inches, twelve inches and fifteen inches in diameter for corresponding size sewer pipes. The remote installation tool 14 generally is equipped with six extension poles of the type shown at 22B–22G and one section 22A which contains a fixture for gripping the mounting fixture 14C.

Generally, the six sections permit the insertion of devices or instruments into sewer pipes which are generally horizontal and as deep as fifteen feet within a manhole in the preferred embodiment although the remote installation tool may be used for other purposes and at other depths. In this specification, the word "remote" may be applied to different distances from an operator from time to time but generally is considered any inconvenient location for the operator to either move to or be able to reach with his own arms or with simple tools and generally will be more than four feet from a safe location for the operator.

Figure 2:
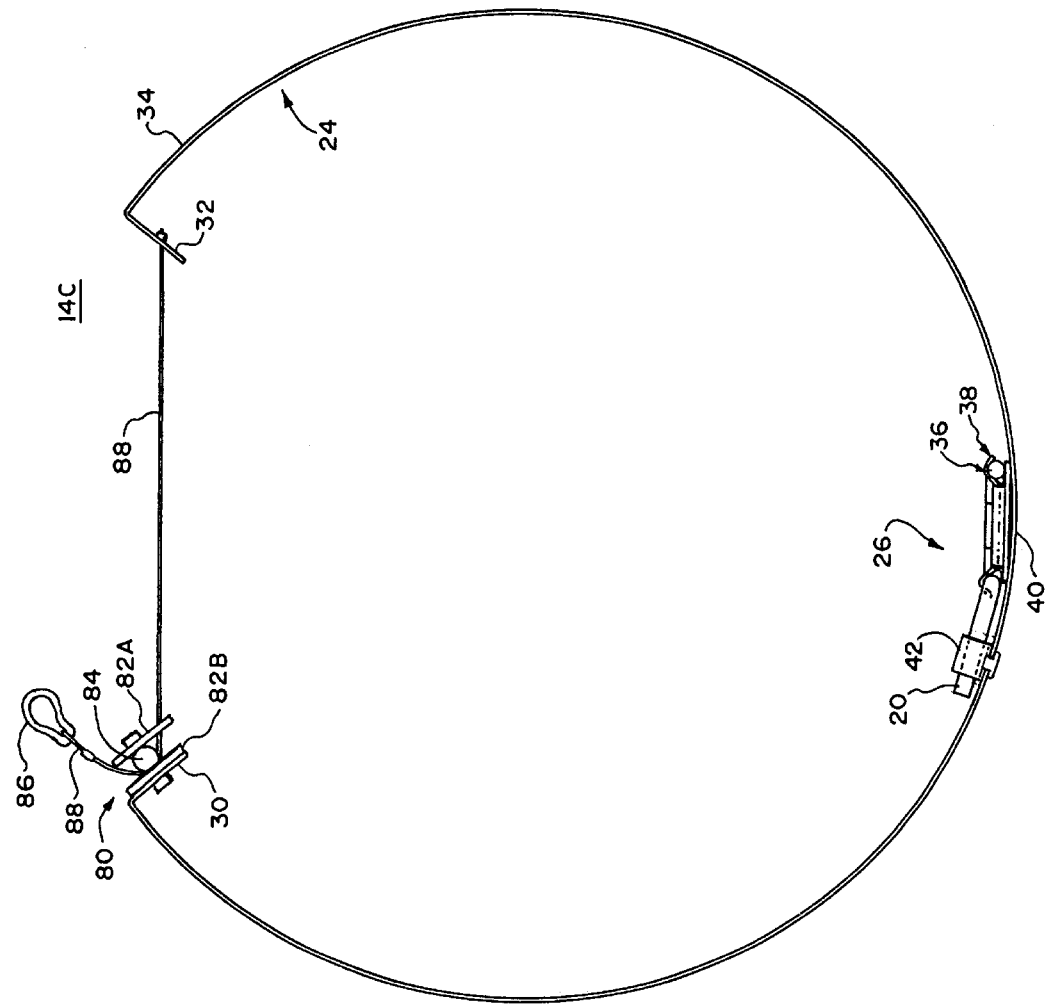
FIG. 2 is an end view of a mounting fixture in accordance with embodiment of FIG. 1.

In FIG. 2, there is shown an end view of the mounting fixture 14C having an expansion ring (pipe spring) 24, a mounting fastener with an instrument called a bubbler port tube held by it shown at 26 and an assembly 80. The assembly 80 includes a frame, a mounting fixture fastening means and a post forming part of the mounting fixture that cooperates with the transfer tool fastening means. The expansion ring 24 includes a cylindrical resilient spring body 34 opening at the top where downwardly extending ears 30 and 32 form the ends of the open portion of the cylindrical tube formed by the spring body 34 so that when the ears 30 and 32 are pulled together, the expansion ring 24 forms a closed tubular cylinder, and when they are released, the expansion ring 24 moves outwardly to compress itself against the walls of the pipe 18 (FIG. 1) in a manner known in the art.

At the end of the expansion ring 24 and connected to the metallic spring body 34 of expansion ring 24 is a fastener and bubbler-port tube assembly 26 shown communicating with a portion of an air tube 20. The fastener and bubbler-port tube assembly 26 includes a clamp 42, a fastener or holder 38 and a bubbler-port tube 36. The fastener 38 holds both ends of the bubbler-port tube 36 and is fastened to the metallic spring body 34 of expansion ring 24 to hold the bubbler-port tube 36 in place with the proper orientation.

The assembly 80 includes parallel plates 82A and 82B, a post 84, an eyelet 86 and an elongated member 88 in the form of a narrow wire cable. The cable 88 is fastened at the center of one ear 32 and extends to the assembly 80 which has one of its flat plates 82B mounted flat against the ear 30 and its other spaced above it to support, among other parts, the anvil or post 84. The elongated member 88 extends through the assembly 80 in a moveable relationship upward to the eyelet 86 so that when the eyelet 86 is pulled, the cord 88 is moved to bring the ears 30 and 32 together and thus compress the expansion ring 24 into a smaller diameter. Conversely, when the eyelet 86 is released, the spring nature of the expansion ring 24 causes it to pull apart, drawing the elongated flexible member 88 into a longer and longer length between the ears 30 and 32 so as to increase the diameter of the expansion ring 24 and permit it to press against a pipe, such as the sewer pipe 18 (FIG. 1) and be held firmly in place.

In summary, the mounting fixture 14C is prepared by mounting a device such as that shown at 26 to it, compressing its diameter, lowering it to a new position such as downwardly through a manhole, inserting it in a remote location such as a sewer pipe, permitting it to expand to be held in place at the remote location and removing the transfer tool used to lower it.

To prepare the mounting fixture, a device such as that shown at 26 is mounted to its inner bottom directly opposite from the elongated member 88 and from its open end so that, if the expansion ring 24 is expanded against the walls of a sewer pipe with its open end upwardly, the device shown at 26 is at its bottom. As an example, the device shown at 26 in FIG. 2 is a bubbler-port mounted in a fixture, which in turn is held by tabs bent upwardly in the body of the expansion ring 24. A conduit or air tube 20, shown broken away extends upwardly so that the bubbler-port may cause pressure in the tube 20 and permit a measurement of the height of the liquid in a manner known in the art.

After the instrument is assembled, the transfer tool 14A (FIG. 1) is moved over the post 84 and gripped. The flexible elongated member 14B (FIG. 1) is fastened to the eyelet 86 and it may be pulled at this point or later to cause the ears 30 and 32 to be pulled together and reduce the diameter of the tubular expansion ring 24. The expansion ring 24 has been selected so that it will fit in the size sewer pipe 18 (FIG. 1) when compressed but it will press 18 against the inner walls of the pipe when released by releasing the cord 88.

To lower the device 26 to the level of the sewer pipe 18 within the manhole 16 (FIG. 1), sections of the handle or transfer tool 14A (FIG. 1) are snapped together in a manner to be described hereinafter until they have the required length down to the sewer pipe. The air tube 20 may be coiled so it may be released as the device 26 is lowered and one end may be attached to the instrument 12 (FIG. 1) to be ready for operation. As the transfer tool 14A is lowered, the flexible elongated member 14B is payed out along the length so that its upper end extends along the manhole 16 where the installer is positioned.

Once the mounting fixture is in place, the cable 14B is pulled if it has not already been pulled until the ears 30 and 32 are moved close together and the diameter of the mounting fixture is sufficiently small to be moved into the sewer pipe. At this time, the transfer tool 14A has been mounted to the post 84 at one end of the expansion ring 24. The other end of the expansion ring 24 is now inserted into the pipe 18 (FIG. 1) so that the transfer tool 14A remains outside the pipe 18 and extends upwardly for easy manipulation by the installer.

Once the expansion ring 24 is inside the sewer pipe 18 (FIG. 1), the cable 14B (FIG. 1) is released and the spring like resilient nature of the expansion ring 24 pulls the cable 88, permitting the ring to expand against the walls of the sewer pipe 18 so that it is held firmly in place with the instrument 26 at the bottom of the sewer pipe for measuring depth.

The transfer tool 14A is now removed from the post 84. The attachment of this tool and the removal from the post can be done remotely by turning the transfer tool handle in one direction such as a clockwise direction to tighten jaws around the post 84 and in the opposite direction to release the post 84. When the post 84 has been released and the mounting fixture is in place within the sewer pipe 18 (FIG. 1), the transfer tool may be pulled upwardly while leaving the conduit 20 and the cable 14B in place. It may then be dismantled and cleaned for a second use.

With the mounting fixture in place, the device it holds may be used. For example, if it is a pH meter, measurements may be made and recorded on the surface by transmitting information over a cable to the surface.

When it is desired to remove the mounting fixture 14C and the device 26 mounted to it from the sewer pipe 18 or other location, the flexible elongated member 14B is pulled by a workman at the surface to condense the mounting fixture in the same manner as was done before inserting the mounting fixture into the sewer pipe. With the mounting fixture condensed to a smaller diameter, it is pulled from the sewer pipe in a series of jerking motions by pulling several times on the elongated member or cable.

If the mounting fixture 14C is jammed in place and cannot be pulled free from the sewer by pulling on the flexible elongated member, the transfer tool 14A is extended into a location adjacent to the post 84 and the gripping means moved over the post. The gripping means is then closed. The flexible elongated member is then used to compress the mounting fixture so that it is released from the location. The mounting fixture may then be pulled free and moved.

While a round expansion ring to be fitted in a round sewer pipe 18 is disclosed herein, the expansion ring may have other shapes consistant with its being fastened by expansion against the walls of a remote location. In the preferred embodiment, the remote location is a sewer pipe but the tool may be used for other purposes. Moreover, while a bubbler-port has been shown as the device to be moved, any other device or instrument may be moved by fastening it to the mounting fixture and fastening the mounting fixture in a proper location.

Figure 3:
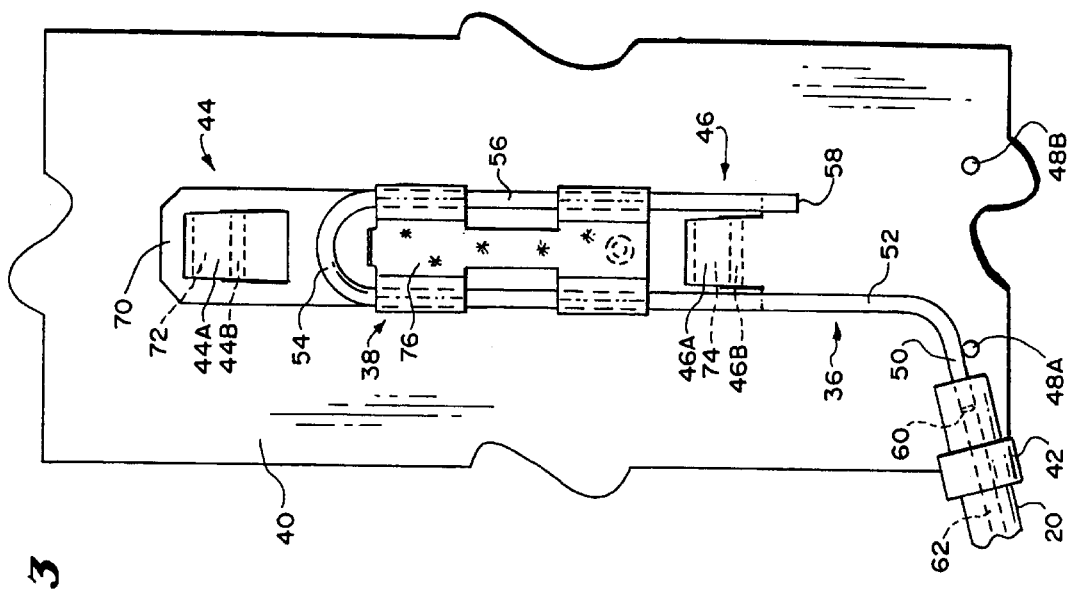
FIG. 3 is an enlarged fragmentary view of a portion of the embodiment of FIG. 2.

In FIG. 3, there is shown a fragmentary plan view of a portion 40 of the expansion ring 24, having a: (1) first tab 44 cut out of the metal expansion ring and bent upwardly at 44B to extend at 44A above the inner surface of the expansion ring where it engages the fastener 38; and (2) a second tab 46 cut out the metal expansion ring and bent upwardly at 46B to extend at 46A above and engage the fastener 38 to hold the fastener 38. The tab 44 upstream of the fluid flow within the manhole 16 and the sewer pipe 18, and the tab 46 is downstream of the fluid flow within the sewer pipe 18.

With this arrangement, the fastener 38 is held in place by slipping appropriate openings over the tabs 44 and 46 to hold it downwardly against the wall portion 40 of the expansion ring 24. The bubble-port tube 36 is held by the fastener 38 to the wall of the expansion ring and has one end extended into the air tube 20 which is held in place by a clamp 42. The wall portion 40 also includes two upwardly extending posts 48A and 48B which may be utilized to aid in holding the fastener or the tube in place and positioning it within the fastener 38.

In the embodiment of FIGS. 2 and 3, the bubbler-port tube 36 includes a first section 50, a second section 52, a third section 54 and a fourth section 56. The first section 50 ends in an opening 60 which is adapted to communicate with the air tube 20 to permit the flow of air all the way to the end 58 of the bubbler port tube.

The fastener 38 includes a base plate 70, an upstream opening 72, a downstream opening 74 and a holder body 76. The holder body 76 may be fastened to the base plate 70 over the upstream and downstream pointing sections 52 and 56 of the bubbler-port tube 36 so that the third section 56 is above the holding members. In the preferred embodiment, the holder body 76 is spot welded to the base plate 70 but may be bolted instead for easy removal. The openings 72 and 74 fit under the tabs 44 and 46 respectively, with the tabs extending through the holes and over the base plate 70 so that the fastener 38 may be slid in place. For this purpose, the tabs 44 and 46 are spaced from each other substantially the same distance as the openings 72 and 74 and are aligned in a direction parallel to the axis of the conduit 20 and to the central axis of the spring holder 24 (FIG. 2) so that the sections 52 and 56 are parallel to the flow of fluid.

Obviously with this construction, other instruments may be mounted with any desired orientation such as to be aligned with the flow of liquid or transverse to the flow of liquid or in any other position. Similarly, the tabs 44 and 46 and the mounting means may be positioned elsewhere than at the bottom of the flow stream or may be positioned along a length of the mounting fixture to permit the stringing of a conduit or the mounting of other instruments.

In FIG. 4, there is shown an exploded elevational view of the bottom section 22A of the transfer tool 14A (FIG. 1) having an end socket 90, a tubular shaft 92 and a mounting fixture grip 94. The end socket 90 receives the tubular shaft 92 in one end, having an opposite open end 100 for receiving an end of another length 22B (FIG. 1) of the transfer tool 14A. The opposite end of the tubular shaft 92 receives the mounting fixture grip 94, which is adapted to grip the post 84 (FIG. 2) when the handle 14A (FIG. 1) including the bottom section 22A is turned clockwise and to release it when it is turned counterclockwise.

The end socket 90 includes a socket portion 102, a detent opening 104 and one of a plurality of fasteners 106 which are spaced circumferentally around the socket to engage the tubular shaft 92 and hold the two together in alignment. With this arrangement, the end socket 90 is fastened to the tubular shaft 92 and includes an open end 100 to receive another length 22B of the transfer tool 14A (FIG. 1). The end of the section 22B (FIGS. 1 and 6) fits within the socket formed by the walls and includes a spring biased detent 172 that snaps into the opening 104 in a manner to be described hereinafter to lock the two members together.

The tubular shaft 92 extends longitudinally between the end socket 90 and the mounting fixture grip 94 being fastened to each at a different one of its ends. Fasteners 108A and 108B are positioned to be threaded through openings in the wall of the tubular wall shaft 92 and rigidly engage a portion of the mounting fixture grip 94 in a manner to be described hereinafter.

The mounting fixture grip 94 includes as its principal parts a clamp body nut 120, a snap ring 122, a mounting grip housing 124 and a eyelet 130. The eyelet 130, the clamp body nut 120 and the mounting grip housing 124 fit together with the shoulder ring 122 being positioned between the clamp body nut 120 and a portion of the mounting grip housing 124 so that the eyelet 130 has a threaded shank passing into the clamp body nut 120 within the mounting grip housing 124.

The clamp body nut 120 includes as its principal parts a cylindrical body portion 140, an angular outwardly extending shoulder 142, a plug 144, an annular inwardly formed groove 146 to receive the snap ring 122, and an internally tapped hole. The body portion 140 is sized to fit tightly within the interior of the tubular shaft 92 so that it may be fastened rigidly in place by the screws 108A and 108B or by other fasteners. The shoulder 142 in this position fits against the outer edge of the tubular shaft 92 immediately ahead of and engaging rotatably the hub 161 of the mounting grip housing 124. The snap ring 122 fits within the groove 146 and when positioned is flat against the opening in the mounting grip housing 124 so that the clamp body nut is held captive rotatably within a portion of the mounting grip housing 124.

The eyelet 130 includes an opening 134 formed by an outer steel ring 132 with the central opening 134 being sized to fit over the diameter of the post 84 (FIG. 2) and engage it within an opening 151 between two collars 150 and 152 of the mounting grip housing 124. The externally threaded shank 136 of the eyelet 130 extends inwardly into the clamp body nut 120 where it engages the internal threads 148 therein, so that, when the clamp body nut 120 together with the handle of the transfer tool 14A is rotated clockwise, the engaged threads pull upwardly on the eyelet 130 which is restrained from turning by the two sides of the collars 150 and 152 so that the post 84 within the opening 134 is pulled upwardly against the walls of the mounting grip housing to hold it rigidly, and when turned counterclockwise, releases the post so that it may be pulled free from the mounting grip housing 124.

To hold the post 84 (FIG. 2), the mounting grip housing 124 includes a first socket 150, a second socket 152, a first beveled end 154, a second beveled end 156, an opening 151 aligned with the sockets 150 and 152 and forming a continuous opening sized to receive the post 84, with the flanged ends 154 and 156 being used as guides so that the post 84 may slide through the collars 150 and 152 and through the opening 134 in the eyelet 130 with its outer diameter being sized to fit within the inner diameter of the sockets 150 and 152.

The sockets 150 and 152 are fastened such as by welding to first and second support brackets 158 and 162 connected together by a hub 161 leaving an opening 160 that the end of the clamp body nut 120 shown at 144 fits through and is held captive within an opening in the hub 161 by the ring 122 on one side and the shoulder 142 on the other side. Thus, the space between the shoulder 142 and the groove 146 is equal to the length of the hub 161 between the upper surface and the opening at 160 and the diameter of the plug 144 is at its outer diameter equal to the opening within the hub 161 to fit conformably therein and permit rotation of the clamp body nut 120 together with the handle while the eyelet 130 is constrained to move upwardly and downwardly to grip or release the post 84 (FIG. 2).

In FIG. 5, there is shown a simplified perspective view illustrating the opening 154 aligned throughout the mounting grip housing 124 supported by a hub 161 with the end of the body portion 165 extending therethrough and the socket portions being rigidly fastened to the hub 161 by the bracket members such as 158 to permit the end of the post to pass therethrough for gripping.

In FIG. 6, there is shown an elevational view of another section 22B of the transfer tool 14A having an end socket 90B and a tubular shaft 92B mounted together in the same manner as the end socket 90 and tubular shaft 92 of FIG. 4. As in that embodiment, an opening 104B is provided through the walls of the end socket 90B to permit snapping in place of a detent to hold still another section 22C (FIG. 1.) A fastener 106B is one of a ring of fasteners holding the end socket 90B and the tubular shaft 92B together.

At the other end of the tubular shaft 92B is an opening 170 including within it a spring biased detent 172 which detent is able to fit within the opening 104 (FIG. 4) to permit the tubular shaft 92B to be held within the end socket 90 (FIG. 4). The outer diameter of the tubular shaft 92 is of the same size as the inner diameter of the opening in the socket 90 (FIG. 4) with the detent 172 being aligned with the opening 104 (FIG. 4) to permit a firm connection between the section 22B and end section 22A of the transfer tool 14A. Similarly other sections, each being approximately two feet eight inches long from one end to the other with an internal opening in the end sockets of approximately two and one quarter inches to the center of the detent opening and one-half inch from the center of the detent opening to the distal end of the socket. With this arrangement, a number of sections may be rigidly connected together with sufficient strength to manipulate the mounting fixture from place to place.

In FIG. 7, there is shown a side elevational view and in FIG. 8, there is shown a top view of a spring loaded detent 180 having a detent button 172 mounted on a first leaf 182 of the spring with a second leaf 184 being positioned to bias the button 172 upwardly. This spring is sufficiently sized so that it may be moved inwardly of the tubular shaft 92B (FIG. 6) so that the detent button 172 extends through the opening 170 (FIG. 6) being biased upwardly by the spring. In this. manner, the detent may lock two sections 22A–22G together with a detent button 172 in each passing through a corresponding opening, such as for example the opening 104B.

In FIG. 9, there is shown a fragmentary plan view, partly broken away, of the mounting fixture and in FIG. 10, there is shown a fragmentary, broken away portion of the assembly 80, illustrating the manner in which the post 84, the eyelet 86, and the cord 88 cooperate together to pull the ears 30 and 32 (FIG. 9 only) together and permit them to be spread apart. As shown in this view, the plate 82B of the assembly 80 is bolted to the ear 30 of the expansion ring 24 by a series of bolts 200A–200D with the plate 82A being spaced from it by spacers 192, 194, 196, 198 and the post 84, forming a space between them for the flexible member 88. The spring 190 takes up the slack in the cable, preventing it from drooping downwarly and perhaps catching floating debris.

The flexible member 88 is connected at one end to the eyelet 86 and extends therefrom to a point midway between the two edges of the expansion ring 24 and midway along the depth of the ears 30 and 32 where it crosses between the ears being fastened by a fastener 202 to the ear 32. Thus, the flexible member 88 applies pressure to the two ears 30 and 32 from a central location of the ears.

To permit the flexible member 88 to exert force on the two ears 32 and 30, the flexible member 88 moveably passes over the spacer 194 in a groove therein between the two plates 82A and 82B adjacent to the ear 30. The helical spring 190 is fastened to a post extending between the two plates 82A and 82B at one end of the helical spring and is attached at the other end to the cord 88 near the post 84 and the location where the cord 88 extends between the ears 30 and 32. With this arrangement, when the expansion ring 124 is in place in a pipe, the cord 88 is held taut by the spring even though the installer is no longer pulling on the elongated flexible member to reduce the diameter of the expansion ring 124.

The column for mounting one end of the helical spring 190 to the plates 82A and 82B is illustrated best in the broken away view of FIG. 10 at 204. As shown in this view, fasteners 206 (FIG. 9) and 208 (FIG. 9) mount the post 84 to the plates 82A and 82B for movement therewith. As shown in this view, the post 84 may be changed in angle with respect to the expansion ring 124 by changing its angle with respect to the plates 82A and 82B. Its angle is changed by loosening a wing nut 206, which exerts pressure on the post 84 to hold it in place, pivoting the post 84 about a pivot 208 and retightening the wing nut 206. Thus, the angle of the expansion ring can be adjusted for the angle of the pipe with respect to the manhole wall so that if the transfer tool is at an angle other than 90 degrees with respect to the axis of the pipe, the expansion ring 124 can match that angle for easier insertion of the expansion ring into the pipe.

Because the post 84 can be inserted into the opening 154 (FIG. 5) and through the collars 150 and 152 (FIG. 4) at any rotational position such as for example with the plates 82A and 82B in the same plane as the longitudinal axis of the handle 22A-22G or any number of degrees such as 30 degrees with respect to that plane, the expansion ring 124 may be easily inserted into the pipe at any angular orientation. Thus, the device mounted at 26 can be at the lowest point or a higher point in the pipe as desired.

In FIG. 11, there is shown a fragmentary schematic drawing of the wire or cord 88 as it is fastened to the ear 32A by passing through an opening therein and being held by a fastener 202. As shown in this view, it extends across to the ear 30A where it is turned over the spacer 194 to permit it to move between the plates 82A and 82B so that, when the cord 88 is pulled, the two ears are moved together to compress and reduce the diameter of the expansion ring 124.

In FIGS. 12 and 13, there are shown a plan view and an elevational view of a belt or cord 210 which may be a portion of the cable 14B or the entire cable. It may be utilized to form a loop 222 which is held in the four fingers of one hand so that it may be easily pulled free without harm while the operator handles the transfer tool 14A with both hands to position the mounting fixture within the pipe 18. The cord can be tightened to reduce the diameter of the expansion ring by sliding the hand with the belt on it upwardly and increased by sliding it downwardly without removing either hand from the transfer tool.

This belt 210, a socket 212 and a plug 218 of the ordinary type to form a loop 222 (FIG. 11) with the remainder of the belt 220 extending downwardly where it may be connected by a cable to the eyelet 86 so as to be readily utilized while handling the transfer tool 14A to reduce the diameter or increase the diameter of the expansion ring as desired. Moreover, this belt can be opened and the loop fastened to the manhole cover after the mounting fixture is in place.

In operation, to fasten the end member 22A and the other portions 22B–22G forming the transfer tool 14A to the post 84 on the mounting fixture, the openings 154, 151, 134 and 156 are passed around the post 84 and the members 22A–22G or any portion of them are rotated clockwise. In this position, the eyelet 130 is moved upwardly by the threads 136 (FIG. 4) into the clamp body nut 120 to exert pressure against the post 84 in the upper portion of the sockets 150 and 152.

To release the post 84 after the mounting fixture is in place, the end member 22A is turned counterclockwise to move the eyelet 130 downwardly until the opening 134 is centered around the post 84. Then the sockets 150 and 152 may be moved along the longitudinal axis of the post 84 until the transfer tool 14A is clear of the post 84, after which it may be retracted from the remote location leaving the mounting fixture and the devices attached to it in place at the remote location.

From the above description, it can be understood that this remote installation tool and method has several advantages, such as for example: (1) it may securely move devices such as instruments or conduits or the like to a remote location including the interior of a sewer and fasten them in place without the operator being in the proximate region of the remote location; (2) it is simple to operate and economical, being capable of operation by a single person; (3) it avoids the danger and cost of having a worker move downwardly, such as for example into a manhole in order to properly install instruments while another worker remains on the surface; (4) it permits adjustment of the angle at which devices are held for mounting so as to adjust to different angled sewer pipes or offset sewer pipes; and (5) it permits easy removal of the device.

Accordingly, although a preferred embodiment of the invention has been described with some particularity, many modifications and variations of the preferred embodiment are possible in the light of the above teachings without deviating from the invention. Therefore, it is to be understood, within the scope of apended claims, the invention may be practiced other than as specifically described.

What is claimed is:

1. Remote location installation apparatus, comprising:
   a mounting fixture; and
   a transfer tool having a longitudinal axis;
   said mounting fixture including means for fastening an object to the mounting fixture and means for fastening the mounting fixture at a remote location;
   said transfer tool including means for mounting and for releasing the mounting fixture to the transfer tool in a plurality of orientations and moving the mounting fixture to said remote location;
   said means for mounting and for releasing including a post extending at an angle to said longitudinal axis and a flexible means; said post and flexible means connecting said mounting fixture at a location spaced from said longitudinal axis, wherein the object may be moved and released at a distance spaced from said longitudinal axis.

2. Apparatus in accordance with claim 1 in which the mounting fixture comprises an expansion ring, the means for fastening the mounting fixture at a remote location includes means for compressing the expansion ring and releasing the expansion ring from a remote distance.

3. Apparatus according to claim 1 in which the transfer tool includes a plurality of sections; at least some of said sections each including means for cooperating with another of said plurality of sections to form a substantially rigid elongated member wherein the length of the elongated member can be varied.

4. Apparatus according to claim 1 in which the means for mounting the mounting fixture to the transfer tool and moving the mounting fixture to said remote location includes a gripping means and a receiving means to be gripped; said gripping means being able to grip said receiving means with any one of a plurality of orientations.

5. Apparatus according to claim 1 in which the means for mounting the mounting fixture to the transfer tool includes a gripping means and the mounting fixture includes means for pivotably receiving said post.

6. Remote location installation apparatus, comprising:
   a mounting fixture; and
   a transfer tool;
   said mounting fixture including means for fastening an object to the mounting fixture and means for fastening the mounting fixture at a remote location;
   said transfer tool including means for mounting the mounting fixture to the transfer tool in a plurality of orientations and moving the mounting fixture to said remote location;
   the means for fastening the mounting fixture at a remote location including an elongated flexible member connected to one edge of the mounting fixture and movably mounted to a second edge, said elongated flexible member having one end adapted to be positioned at one end of the transfer tool at a remote location from the mounting fixture, whereby it may be pulled to compress the mounting fixture and released to permit the mounting fixture to expand against walls at the remote location.

7. Remote location installation apparatus, comprising:
   a mounting fixture;
   a transfer tool;
   said mounting fixture including means for fastening an object to the mounting fixture and means for fastening the mounting fixture at a remote location;
   said transfer tool including means for mounting the mounting fixture to the transfer tool in a plurality of orientations and moving the mounting fixture to said remote location;
   said mounting fixture comprises an expansion ring, the means for fastening the mounting fixture at a remote location includes means for compressing the expansion ring and releasing the expansion ring from a remote distance;
   said means for compressing including a flexible elongated member;
   said flexible elongated member including means for fastening one end to an installer while permitting the installer to keep both hands free and to fasten the same one end to an inanimate object near a manhole.

8. Apparatus according to claim 7 in which the means for fastening includes means for enabling removal of said mounting fixture by pulling said flexible elongated member.

9. A method of mounting an object at a remote location, comprising the steps of:
   mounting the object to a mounting fixture;
   fastening the mounting fixture to a transfer tool;
   moving the mounting fixture to the remote location with the transfer tool and actuating a fastening means at the remote location to fasten the mounting fixture thereto;
   releasing the mounting fixture from the transfer tool and removing the transfer tool; and
   removing the mounting fixture from the remote location by actuating the fastening means.

10. A method in accordance with claim 9 in which the step of fastening the mounting fixture to the transfer tool includes the steps of placing the mounting fixture and the transfer tool in juxtaposition and actuating a gripping means to hold the two together.

11. A method in accordance with claim 10 in which the step of fastening the mounting fixture to the transfer tool includes the steps of:

determining an angle at which a pipe enters a manhole; and adjusting the angle of the mounting fixture to the transfer tool to permit the mounting fixture to align with the pipe when brought close to the pipe on the end of the transfer tool.

12. A method in accordance with claim 10 in which the step of fastening the mounting fixture to the transfer tool includes the steps of:

determining offsets of a pipe from the longitudinal axis of a manhole; and adjusting the angle of the mounting fixture to the transfer tool to permit easy insertion of the mounting fixture.

13. A method in accordance with claim 9 in which:

the step of mounting an object to a mounting fixture at a remote location includes the step of mounting the mounting fixture to the end of the transfer tool by a gripping means;

moving the end of the transfer tool to the remote location;

compressing the mounting fixture;

moving the mounting fixture into place;

releasing the mounting fixture so that it expands in place and is mounted in place; and releasing the transfer tool from the mounting fixture and removing it.

14. A method according to claim 9 in which the step of removing the mounting fixture includes the step of pulling on an elongated member.

15. A method of mounting an object within a sewer from a street, comprising the steps of:

fastening the object to an expansion ring;

gripping a portion of the expansion ring at the end of an elongated pole;

fastening at least one conduit to the object at one end of the conduit;

pulling upwardly on an elongated cord to cause the expansion ring to be compressed together edge to edge and moving it downwardly while permitting the elongated pole holding the edges of the expansion ring together to be extended downwardly so that it is gripped at the street level while the expansion ring is dropped through a manhole to the level of a sewer pipe and permitting the conduit to be played downwardly so that one end extends above for connection to an instrument;

moving the expansion ring with the object on it into the sewer pipe and releasing the elongated cord so that the expansion ring is compressed against the walls of the sewer pipe and held in place; and releasing a mounting fixture from the elongated pole and removing it.

16. A method according to claim 15 in which the expansion ring is removed from the pipe and pulled to street level by pulling on said elongated cord.

17. A method in accordance with claim 15 in which the step of gripping a portion of the expansion ring at the end of an elongated pole includes the steps of:

determining offsets of the pipe from the longitudinal axis of the manhole; and adjusting the angle of the mounting fixture to the pole to permit easy insertion of the mounting fixture.

* * * * *